Figure 1:
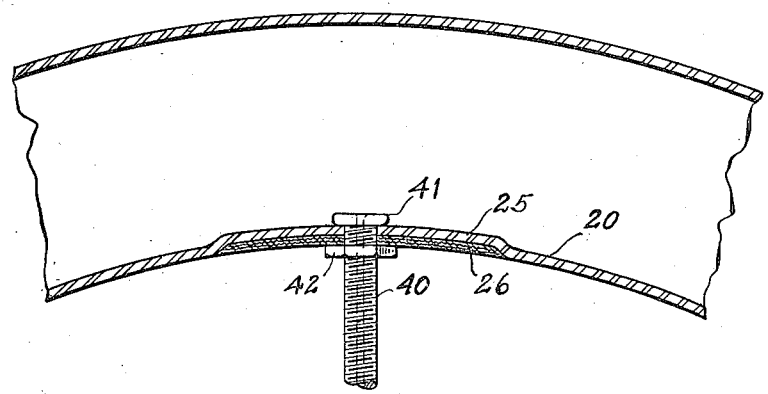

Aug. 5, 1924.

W. E. ROBERTS 1,503,667

METHOD OF MAKING HOLLOW RUBBER ARTICLES

Filed Dec. 29, 1919     2 Sheets-Sheet 1

INVENTOR
Wm. E. Roberts,
BY Bakes & Macklin,
ATTORNEYS.

Aug. 5, 1924.  
W. E. ROBERTS  
1,503,667  
METHOD OF MAKING HOLLOW RUBBER ARTICLES  
Filed Dec. 29, 1919  
2 Sheets-Sheet 2

Patented Aug. 5, 1924.

1,503,667

UNITED STATES PATENT OFFICE.

WILLIAM E. ROBERTS, OF ANDOVER, MASSACHUSETTS.

METHOD OF MAKING HOLLOW RUBBER ARTICLES.

Application filed December 29, 1919. Serial No. 348,094.

*To all whom it may concern:*

Be it known that I, WILLIAM E. ROBERTS, a citizen of the United States, residing at Andover, in the county of Essex and State of Massachusetts, have invented a certain new and useful Improvement in Methods of Making Hollow Rubber Articles, of which the following is a full, clear, and exact description, reference being had to the accompanying drawings.

This invention relates to the reinforcing of rubber articles and especially to hollow rubber articles where it is not feasible or desirable to apply a patch to the interior. An instance where my method of reinforcing is very desirable is in connection with attaching the valve nipples to inner tubes for automobile tires, and particularly to those tubes which are formed of continuous annular sections connected by peripheral seams. It is desirable that the wall of the tube be reinforced about the valve nipple; it is also desirable that this reinforce does not project materially beyond the outer surface of the tube. My invention is designed to accomplish these results effectively and economically without requiring an internally applied patch.

In the usual way of making annular tubes, they are first formed as a straight tube with open ends and this tube bent into an annulus and the ends overlapped and cemented together. With such a tube it is possible to locate a reinforcing patch on the inside, as it may be inserted through the open end of the tube before its ends are joined together, or placed on the outside and the tube thereafter turned inside out, though neither of these methods are entirely satisfactory. When, however, the tube is originally formed as a closed annulus, it is not feasible to apply thereafter a reinforcing patch on the interior.

My invention, however, provides for this reinforcing of hollow rubber articles after they are initially formed, in a very simple and effective manner. I have found that I can accomplish the desired results by placing a properly formed reinforcing patch on the exterior of the rubber article, while it is in the raw state, and vulcanize such reinforced article in a mold which has a smooth and continuous surface extending continuously across the region which the patch occupies and the adjacent portion of the article. When such an article is vulcanized in such a mold under internal fluid pressure, the body wall is forced tightly against the surface of the vulcanizing mold and this causes the material of the rubber wall to bend inwardly at the patch sufficiently to make the exterior surface of the patch flush with the rest of the exterior of the article, the thickening being thus by means of an inwardly distorting wall portion of the article itself, the depression thus provided being entirely and evenly filled by the added patch. This is particularly valuable in connection with inner tubes, where it is important that the exterior be kept smooth.

My invention comprises a method of reinforcing articles as above outlined, and this is hereinafter more fully explained and the essential novel features are summarized in the claims.

Figure 2:
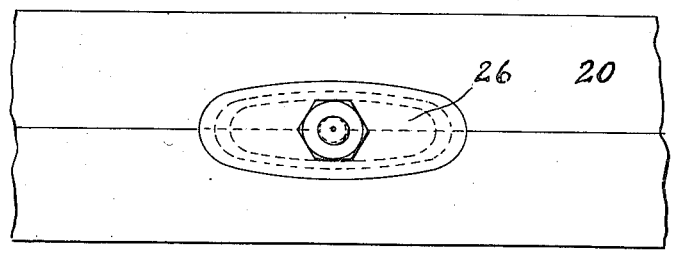
Figure 5:
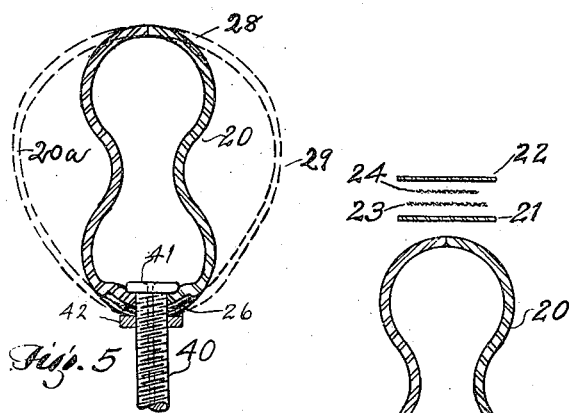
Figure 3:
Figure 4:
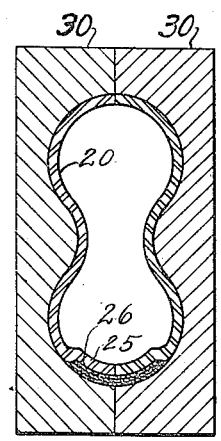
Figure 6:
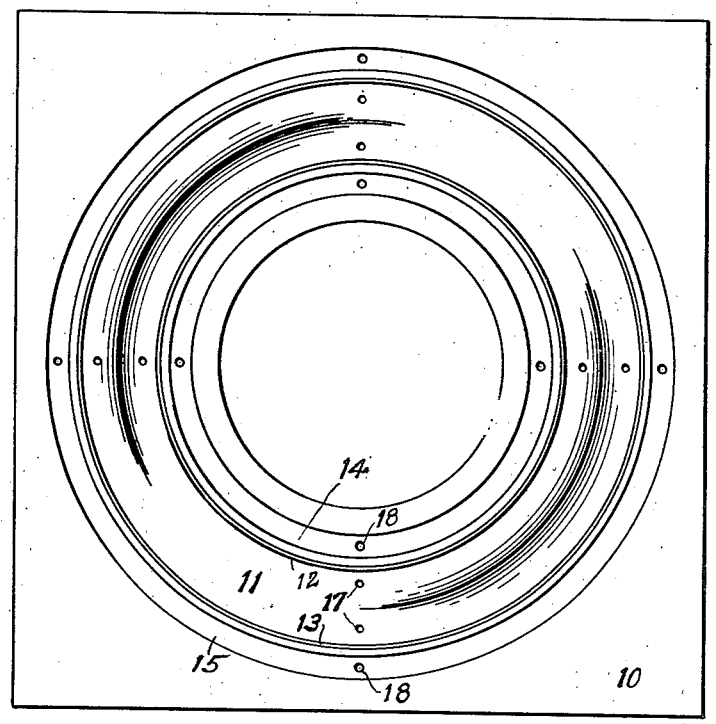
Figure 7:
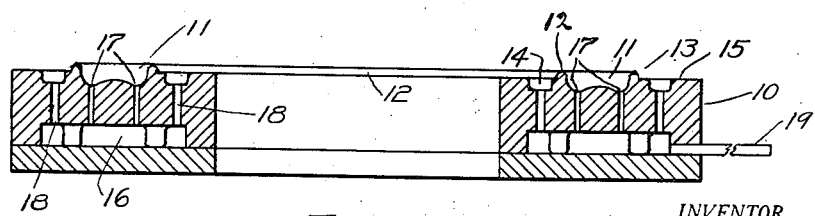

The drawings disclose a pneumatic tube in various stages of operation and also apparatus which may be employed in its manufacture. In the drawings, Fig. 1 is a central section through a portion of an annular tire tube having my reinforced patch, the plane of the section being that in which the inner and outer periphery lie; Fig. 2 is a view of a portion of the tube looking at its inner periphery; Fig. 3 of the cross section of the tube in its preferred form before the patch is applied, this view showing the different portions of the patch separated for clearness of illustration; Fig. 4 is a cross section of the reinforced tube in a vulcanizing mold, showing the form after vulcanization; Fig. 5 is a cross section of the finished tube at the filling nipple showing also in broken lines the tube inflated; Fig. 6 is a plan of a forming mold adapted for manufacturing a completely annular tube from two sheets of rubber stock; Fig. 7 is a cross section of one of these molds.

Figs. 6 and 7 illustrate a tire forming mold shown and claimed in an application of Fred T. Roberts, No. 323,851, filed September 15, 1919, while the method of making annular tubes, involving the employment of such a mold is claimed in application of Fred T. Roberts, No. 154,072, filed March 12, 1917.

Referring briefly to Figures 6 and 7, 10 indicates a block having an annular cavity 11, the cross sectional contour of which is substantially half of that of the exterior of the tube to be formed. At the inner and outer edges of this cavity are annular cutting ribs 12 and 13, and beyond these ribs are annular grooves 14 and 15. In the base of the mold members is an annular chamber 16 with which the cavity 11 communicates by passageway 17 and the cavities 14 and 15 by passageways 18.

In the formation of the tube by means of the molds described a sheet of raw rubber is laid over the main cavity and the annular grooves and preferably pressed downwardly at the annular grooves, and suction is applied through the pipe 19, such suction drawing the marginal portions of the sheet into the clamping grooves 14 and 15 and drawing the intermediate region with the sheet into the main cavity 11.

When two sheets have been thus seated in two molds, an expanding substance, as ammonia powder or water, is placed in the stock seated in one of the molds. Then the other mold in an inverted position is caused to engage the upwardly facing mold and the two are forced together by hydraulic pressure which joins the two sheets of rubber at the inner and outer periphery of the cavity 11 and shears off the surplus stock, thus producing the tube 20 as shown in Fig. 3.

The tube is shown as having the cross section of an elongated loop with a contracted waist, which has been found a beneficial form since such a tube, when inflated in the tire casing, is somewhat stretched at the sides, and thus becomes relatively thinner at the sides and correspondingly thicker at the tread, thereby placing the rubber where it is most effective.

After the tube 20 has been formed it is removed from the forming mold as a complete closed annulus. The patch is then applied to its exterior in the region to be occupied by the valve nipple. Such patch is shown separately in Fig. 3 and comprises an inner rubber sheet 21, an outer rubber sheet 22, and two or more sheets of fabric 23 and 24, which are preferably of different area from each other. This composite patch is compressed tight against the outer surface of the formed tube 20, the rubber sheet 22 overlapping the edges of the fabric 24 and directly engaging the larger sheet of fabric 23. The fabric thus becomes directly embodied and held in the patch, and the patch as a whole adheres to the exterior of the tube.

The tube with the patch applied to the exterior is then placed in a separable vulcanizing mold such as shown at 30 in Fig. 4. When such a mold is locked and heat applied, the substance within the tube expands and gives sufficient pressure to force the soft rubber wall snugly against the surface of the mold cavity. The wall bends inwardly as at 25 about the patch (designated 26 as a whole) and thus when vulcanized the exterior of the patch is flush with the exterior of the tube. The walls of the tube in this region thus have a depressed portion exactly occupied by the patch.

After vulcanization the article is removed from the vulcanizing mold. If the reinforced article is a pneumatic tube a hole is made through the patch and tube, the valve nipple inserted through this hole, the rubber being stretched sufficiently to allow the head of the nipple to pass through the hole. Then the nut on the nipple is screwed down on the outer face of the patch, clamping the nipple to the tube. This completes the tube, making the structure shown in Figs. 1, 2 and 5, where 40 indicates the nipple, 41 the inner head, and 42 the usual nut. Fig. 5 illustrates by the broken lines $20^a$ the tube in its inflated form having the relatively thickened tread portion 28 and the relatively thin sides 29, as desired.

A pneumatic tube may be manufactured in the manner described completely annular and with its only junction two peripheral vulcanized seams. The filling nipple is effectively secured to such tube by reason of the reinforcing. There is no danger of the nipple pulling loose or tearing the tube, and the flush exterior of the patch and tube prevents the patch being accidentally detached in use. The whole construction is thus simple and very effective.

Reference is made to my co-pending application, Serial No. 495,488, filed August 26th, 1921, for claims on inner tubes, illustrated in the drawings hereof, which may be produced by the method herein claimed.

I claim:

1. The method of making pneumatic tubes for vehicle tires, comprising forming a closed annular tubular body, applying to the exterior thereof a patch, placing the patched tube in an annular cavity, causing fluid pressure within the tube to make said patch seat within a depression formed in the exterior of the tubular body with the outer face of the patch substantially flush with the exterior surface of the body, vulcanizing the body and patch while so held, perforating the patch and body behind it, and passing a nipple through such perforation.

2. The method of making inner tubes for vehicle tires, comprising forming the tube as a closed annulus with a heat expanding substance within it, placing a patch on the exterior of the tube, vulcanizing the tube within a mold having a continuous annular cavity with a smooth surface whereby the internal pressure causes the exterior of the patch and the surrounding region of the tube to form a continuous flush surface, thereafter perforating the patch and the tube wall behind it, and applying a nipple through such perforation.

3. The method of making inner tubes for vehicle tires, comprising forming the tube of raw rubber as a closed annulus with a heat expanding substance within it, cementing on the exterior of the tube a patch composed of raw rubber and internal fabric, vulcanizing the tube and patch within a mold having a continuous annular cavity whereby the internal pressure causes the exterior of the patch and the surrounding region of the tube to form a continuous flush surface, thereafter perforating the patch and the rubber wall behind it, passing a nipple through such perforation, and clamping the rubber wall and patch between an inner head on the nipple and a nut screwing onto the shank of the nipple.

4. The method of making inner tubes for vehicle tires, comprising forming the tube as a complete annulus from two sheets of rubber joined together by peripheral seams, applying a patch to the exterior of such annular tube, distorting the wall of the tube inwardly in the region of the patch to provide a depression snugly occupied by the patch, perforating the patch and the tubular wall behind it, and inserting a nipple through such perforation.

5. The method of making inner tubes for vehicle tires comprising forming the tube as a complete annulus from two sheets of raw rubber joined together by peripheral seams, cementing a patch of raw rubber and fabric to the exterior of such annular tube, distorting the wall of the tube inwardly in the region of the patch to provide a depression snugly occupied by the patch, by means of an internal fluid pressure and an outside retaining wall, perforating the patch and the tubular wall behind it, inserting a nipple through such perforation, and clamping the rubber wall and patch between an inner head on the nipple and a nut screwing onto the shank of the nipple.

6. The method of making pneumatic tubes for vehicle tires comprising forming a tubular member as a closed body, applying a patch to the exterior thereof while the body is uncured, vulcanizing the tubular member and patch with the patch and adjacent portion of the tubular member forced by internal fluid pressure against a surface adapted to cause the patch to seat in an inwardly depressed portion of the tubular member, and inserting a nipple through the patch and tubular member.

In testimony whereof, I hereunto affix my signature.

WILLIAM E. ROBERTS.